Figure 1:
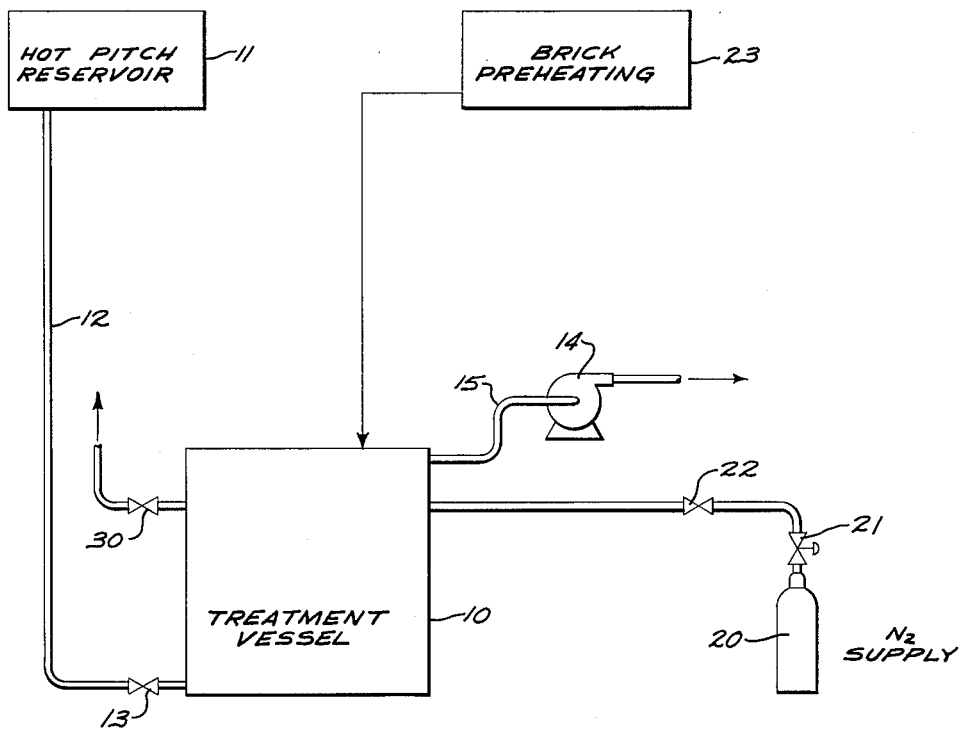

June 7, 1966 W. H. GRANT ETAL 3,255,032
BRICK TREATMENT
Filed Jan. 3, 1964

INVENTORS
WILLIAM H. GRANT &
JOHN A. PLUSCH, JR.
BY
ATTORNEY

United States Patent Office 3,255,032
Patented June 7, 1966

3,255,032
BRICK TREATMENT
William H. Grant, Hammond, Ind., and John A. Plusch, Jr., Calumet City, Ill., assignors to Harbison-Walker Refractories Company, Pittsburgh, Pa., a corporation of Pennsylvania
Filed Jan. 3, 1964, Ser. No. 335,556
19 Claims. (Cl. 117—38)

This invention relates to an improved process for the treatment of ceramically bonded refractory shapes and, more particularly, to an improved process of impregnation of high temperature ceramically bonded basic refractories. In a specific aspect, the invention relates to improvements in the process disclosed and claimed in copending application Serial No. 308,853, filed September 13, 1963, by Weaver, entitled "Impregnation." This application is owned by a common assignee.

The invention, as does that of the copending application just mentioned, has particular utility in the impregnation of basic refractory brick suitable for use in lining vessels used in the production of steel by the oxygen blowing process, variously referred to as the LD process, the oxygen converter process or, generally, as oxygen steelmaking.

The oxygen steelmaking process is only a little over ten years old, the first basic oxygen furnace steel having been taped in Austria in about 1952. In 1954, the process was pioneered in Canada, and shortly thereafter in the United States. It is rapidly proving itself a versatile competitive process, requiring far less capital investment, and much faster than the work horse open hearth furnace which has been the steelmaking industry's primary steel producing facility for many years. The unique ability of the oxygen steelmaking process to provide good quality steel at a rapid rate has so influenced the steel industry, that more and more oxygen steelmaking systems are being built every day.

The great interest in oxygen steelmaking processes has. stimulated manufacturers of refractories to supply products better able to withstand the chemical and physical conditions present in these processes. In these processes, the slag produced is essentially basic (from a chemical standpoint); and, therefore, a basic refractory material. has been considered most applicable. The lining materials most generally used are materials selected from the group dead burned dolomite, dead burned magnesite, mixtures thereof, together with small additions of hard burned lime (usually no more than about 10%, by weight). These basic refractory materials have been bonded with tar or pitch. For some installations, such tar bonded basic refractory mixes have been rammed into place to form a monolithic structure in situ. Refractories of these types have given satisfactory service in many oxygen steelmaking vessels. However, such bonded refractories are not wholly satisfactory in terms of strength, resistance to abrasion and resistance to thermal shock.

As noted in the copending application, 308,853, above identified, the refractories technologist has recognized that burned basic brick frequently possess much greater strength than the unburned or bonded brick, due to the ceramic bond which is formed in the burned brick during the firing procedure. However, these technologists have also recognized that burned basic brick are generally more prone to spall than chemically comparable bonded or unburned brick. Thus, it has been suggested that burned basic brick, otherwise chemically compatible with the oxygen steelmaking process, be saturated or impregnated with nonaqueous, cokable, carbonaceous material such as coal tar pitch or petroleum tar, to provide more spall-resistant refractory for the oxygen steelmaking process. Examples of very satisfactory, ceramically bonded, impregnated refractory brick are disclosed in United States Patent No. 3,106,475, Davies et al., entitled "Burned Refractory Product" and in copending application, Serial No. 254,013, filed January 25, 1963, now Patent No. 3,141,790 for "Oxygen Steelmaking," also by Davies et al., and owned by a common assignee.

Copending application, Serial No. 308,853, has provided an improved manner or process of accomplishing the tar impregnation or saturation of burned basic brick, as compared to the previous "hit or miss" dipping method. It has been found, however, that, under certain process conditions, brick impregnated according to the process of said copending application, Serial No. 308,853, are not as satisfactory as one might desire. For example, liquid pitch (it is liquid because of the elevated temperature to which it is heated. For a good discussion of bonding pitches, which are also used for impregnation, see the U.S. Patent to Davies et al., Serial No. 3,070,449) contains varying quantities of insolubles, which are deposited on the surface and within refractory ware during the impregnation process. When the pitch is allowed to stand too long, with commensurate loss of volatiles, the percentage content of insolubles increases. These insolubles, in some instances, tend to clog refractory ware; but even more interesting is the fact the thicker pitch tends to entrap volatiles in the center of the brick during impregnation. Upon release of pressure, which is normally exerted for the impregnation, there is a pressure drop which allows escape of the trapped volatiles from the refractory ware, thereby causing a rupture of the surface covering or envelope of pitch as the volatiles escape from the ware. To the art, the resulting brick has what is termed an "objectionable ware surface." It is so roughened that some surface treatment or finishing is often required before the brick can be laid up properly.

It is an object of this invention to provide an improved process of impregnating ceramically bonded basic refractory bodies. It is another object of the invention to provide an improved process of impregnating ceramically bonded basic refractory brick with more uniform and satisfactory smooth ware surface characteristics.

It is still another object of this invention to provide a process for impregnating ceramically bonded, basic refractory shapes with a nonaqueous cokable carbonaceous material, which process assures substantially uniform saturation of the burned refractory shape through its cross section and characterized by a substantially smooth surfaced envelope about its exterior consisting of said carbonaceous material.

In the copending application of Weaver, Serial No. 308,853, there is taught a multi-step treatment of burned basic refractory shapes. The treatment includes placing a heated brick in a closed chamber, and subjecting the chamber to reduced pressure to assure substantial elimination of air pockets and entrapped moisture from the interstices of the ceramically bonded grain structure which constitutes the shape. The evacuated brick is then submerged in a pool of heated, cokable, nonaqueous, carbonaceous material which is inert to the material of the shape. The pool is subjected to pressurization by a gas chemically inert to the shape and to the carbonaceous material. After pressurization (for a very short period of time) the carbonaceous material is removed from the treatment vessel, and impregnated brick or shapes recovered. According to this invention, in one embodiment, before or after heating of the brick and prior to its subjection to reduced pressure, a thin layer of fluid-impervious paint, tape, or like material, is placed over a surface of the ware. As will be explained, whether this layer is applied before or after preheating depends on the material selected. The process of impregnation then proceeds in the manner just described. When the brick are removed from the treatment vessel, pressure is released from the trapped volatiles within the brick, but this release is beneath the tape. The center portion of the taped area is forced away from the ware and forms a surface bubble. As the ware cools, the bubble collapses. Any unimpregnated portion of the refractory ware is limited to a small area immediately beneath the tape, and to a depth which seldom exceeds on the order of 1/8". Generally, however, there is substantially complete impregnation, since the still hot carbonaceous material fills the void space left by the escaping volatiles, and one still obtains a completely impregnated shape.

Figure 2:
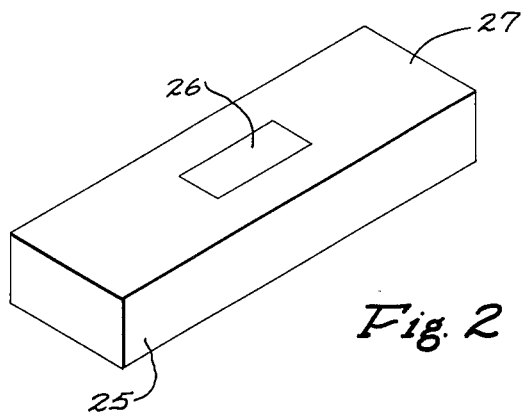

A better understanding, other objects and further features and advantages of the invention will become apparent to those skilled in the art from a study of the following detailed description, with reference to the drawings. The drawing is a schematic flow diagram of a preferred embodiment of my process for impregnating refractory shapes with a nonaqueous, cokable, carbonaceous material. In these drawings:

FIG. 1 is a schematic diagram of interconnected apparatus parts usable in the practice of the invention; and FIG. 2 is a shape prepared according to this invention which is to be impregnated in the equipment shown in FIG. 1.

An autoclave-type treatment vessel 10 is provided. A hot pitch reservoir 11 is connected through a conduit 12 and valve 13 to the bottom of the vessel 10. An evacuating pump 14 is connected through conduit 15 to an upper portion of the vessel 10. A supply of gas under pressure 20 (such as nitrogen gas or carbon dioxide, which gases are chemically inert to the process raw materials) is connected through a pressure regulator 21 and a valve 22 to an upper portion of the vessel 10. A brick preheating furnace or kiln 23 is, preferably, situated closely adjacent the vessel, so heated brick may be rapidly removed from the kiln, prepared for treatment, and then placed in the treatment vessel before they cool excessively.

A prepared brick 25 is shown in FIG. 2. In a preferred embodiment, the brick 25 is a rather large one, such as a 24 x 6 x 3" key. The more conventional 9" straight (nominally about 9 x 4½ x 3½") can be treated according to this invention but, generally, it is not necessary, since the above related problems of volatile entrapment appear to predominantly occur only with larger shapes such as the key just mentioned. The key shape 25 is taped with a 3" strip of 2" wide cellophane pressure tape 26. A tape I find particularly satisfactory is Scotch brand, pressure-sensitive tape, #232. The tape is usually placed on one of the longer faces, such as a 24 x 6 face 27. Tests have indicated satisfactory results can be obtained by placing the taping material on the brick face at a substantially central location (i.e., with about a 14 inch strip of tape, the ends are spaced approximately 5" from the ends of the brick). It appears as if almost any portion of the refractory ware can be taped to produce the desired effect. However, it is suggested that one of the larger faces be taped, as is shown in the drawings.

While vapor and fluid-impervious adhesive cellophane tape a preferred material, this preference is primarily an economic one, since such tape is a relatively inexpensive, readily available item of commerce. It should be understood that other materials have been used. For example, thin sheets of metal foil, such as aluminum or tin, having an adhesive on one surface, are quite satisfactory. Further, it is acceptable and in fact preferable from a materials handling aspect to spray or otherwise apply, as by brushing, for example, a film-forming coating material over a small area of the brick to obtain the desired result. It is, of course, necessary that the film-forming material maintain its self-sustaining identity over the temperature range normally encountered in the process, as is dealt with in more detail below. We have found aluminum paint to be very satisfactory. One advantageous aspect of aluminum paint is that the brick may be treated before the preheating step.

In actual operation, the pitch or tar is maintained at a temperature above about 200° F. and, preferably, in the range of 285 to 300° F. The temperature of the pitch or tar should be at least about 100° F. above its softening point. Such a temperature is necessary to maintain the material in a fluid condition (a viscosity of less than about 350 centipoises, for example) so as to allow easy ingress and egress through the interconnecting conduits to and from the treatment vessel and, also, be in condition to saturate the refractory ware. The brick preheating furnace or kiln 23 must be capable of maintaining the refractory shapes or brick in a soaking heat of about 200–500° F. and, preferably, in the range 250–350° F.

The gas supply 20, through its pressure regulating device 21 (which may be any one of the many well-known pressure regulating devices conventionally used with tanks of gas under pressure), is arranged to apply about 90 p.s.i. pressure to the treatment vessel interior upon the opening of valve 22.

A specific embodiment of a preferred sequence of process steps is as follows: Brick 25 are preheated to a temperature of about 325–350° F. The heated brick are removed from the kiln, and a strip of pressure-sensitive fluid and vapor-impervious pressure-sensitive cellophane tape is applied to one of the larger surfaces of the shape. The tape is, preferably, substantially centrally located on the selected face of the ware to be impregnated. The area the tape covers is limited to a small portion of the face. For example, on a 24 x 3" substantially rectangular face, the piece of tape will be about 3" long and about 2" wide. It can cover an entire face, but this really is not necessary. Also, with a relatively narrow flexible tape, one can wrap completely around four faces, if desired. The taped brick, while still at a temperature of about 325° to 350° F. (some cooling obviously occurs between the kiln and the treatment vessel, but I believe it to be no more than 25 or 30 degrees) are placed in the treatment vessel 10 and the vessel is closed from the atmosphere. The vessel is evacuated to a pressure of about 25 inches of mercury. The reduced pressure is maintained for approximately 5 minutes, or until such time as the interstices of the taped preheated brick are evacuated of entrapped air or moisture. Liquid, nonaqueous, cokable, carbonaceous material, at a temperature in the range of about 285–300° F., is rapidly introduced to the vessel in a quantity sufficient to flood the vessel to a level sufficient to completely immerse the preheated and taped brick. The vessel is pressurized with a gas inert to the material in the vessel, preferably $CO_2$ gas, to a pressure on the order of about 90 p.s.i.; and this pressure is maintained for about 5 minutes. Pressure is then released to bring the vessel to atmospheric pressure conditions, the vessel opened, and the impregnated brick recovered and allowed to cool.

In alternative treatment processes, the brick, after removal from the treatment vessel, are reheated to a temperature above 200° F. and below 1000° F., preferably in the range 250–500° F. Further, in some instances, after drainage or removal of the excess heated pitch from the treatment vessel, the vessel is repressurized to super-atmospheric pressure, i.e. about 90 p.s.i. for a few minutes, 5 minutes being considered satisfactory and preferred.

It is preferred that a liquid level indicator be interconnected with the pitch reservoir, in a position easily read from the exterior thereof. Such a level is one means of ascertaining when the treatment vessel has been drained after a treatment cycle. For example, one knows the approximate quantity of pitch required to fill the vessel, and that each brick or shape will take up on the order of 6 to 10%, by weight, based on the weight of the refractory ware, of the heated pitch. Thus, when the liquid level on the pitch reservoir indicates return to the pitch reservoir of all but a small quantity of the pitch, one knows the treatment vessel is satisfactorily drained.

The composition of basic refractory brick impregnated according to this process can be, for example, those disclosed in United States Patent 3,106,475 and copending application, Serial No. 254,013, both previously identified. The process of the invention can be used for treating other burned basic refractory shapes; for example, brick made entirely of grain of the type made according to the process of United States Patent 3,060,042, Leatham et al. The brick can be entirely made from dead burned dolomite. Less critical metallurgical process requirements, than those required for an oxygen converter vessel, may allow one to use brick less pure than above mentioned; for example, brick having up to about 20% of ingredients other than MgO and CaO (by weight, on an oxide basis). Exemplary additional ingredients could be, for example, such as chrome ore, alumina, etc.

The above noted application, Serial No. 308,853, to which the present application is a related improvement, is, in turn, a continuation-in-part of copending application, Serial No. 215,140, filed August 6, 1962, by Weaver.

Having thus described the invention in detail and with sufficient particularity as to enable those skilled in the art to practice it, what is desired to have protected by Letters Patent is set forth in the following claims.

We claim:

1. The process of impregnating porous, ceramically bonded refractory shapes which comprises (1) subjecting the shapes to a preheating step, which includes applying sealing means to an exposed surface of the shapes, said sealing means arranges to prevent ingress to a limited surface area of heated cokable, nonaqueous, carbonaceous material in which the shape is subsequently immersed, (2) placing the preheated shapes, while still hot, in a vessel, (3) providing a reduced atmospheric pressure in said vessel for a time sufficient to evacuate entrapped air and moisture from the interstices of the ceramically bonded grain structure which constitutes the shapes, (4) submerging the air and moisture-free shapes, while still hot, in a pool of heated, cokable, nonaqueous carbonaceous material, inert to the material of which the shapes are fabricated, the temperature of the pool being between that which is as least sufficient to produce a relatively easily pumped and flowable consistency therein so it will easily penetrate the internal interstices of the shape submerged therein, and below that which will cause such evolution of volatile constituents thereof as will result in extreme coagulation and thickening thereof, (5) subjecting the pool to increased pressure for a time period sufficient to saturate the evacuated interstices of the shape, to produce substantially uniform cross sectional impregnation thereof, (6) releasing the pressure, and (7) removing and cooling the impregnated shapes.

2. The process of claim 1, in which the shapes are preheated to a temperature between about 200 and 500° F.

3. The process of claim 1 in which the sealing means is applied before preheating.

4. The process of claim 1, in which the cokable, nonaqueous carbonaceous material is heated to a temperature between 250 and 450° F.

5. The process of claim 4, in which the carbonaceous material is heated to a temperature between about 285 and 300° F.

6. The process of claim 1, in which the preheated shapes are subjected to a reduced atmosphere of 25 inches of mercury, immediately preceding the submergence in the pool of carbonaceous material.

7. The process of claim 1 in which the sealing means is aluminum paint.

8. The process of claim 1, in which the sealing means is a strip of pressure sensitive cellophane-type tape and which is of such a size as to cover less than the complete area of the surface upon which it is applied.

9. The process of claim 1, in which the ceramic shapes are comprised of at least 96% MgO+CaO, on the basis of an oxide analysis, the CaO amounting to between 1 and 59%, by weight.

10. The process of claim 1, in which the shapes are comprised of at least 96% MgO, by weight, on the basis of an oxide analysis.

11. The process of claim 1, in which the shapes are subjected to the pool, under pressure, for a time sufficient to have a weight increase between about 6 and 10%.

12. The process of impregnating porous, ceramically bonded basic refractory shapes, which comprises preparing a basic refractory shape by subjecting it to a soaking heat for a time sufficient to heat the shape to a temperature between 200 and 500° F., and by applying sealing means to an exposed surface of the preheated shapes, said sealing means arranged to prevent ingress to a limited surface area of heated, cokable, nonaqueous, carbonaceous material in which the shape is subsequently immersed, then placing the shape in a closed chamber, subjecting the chamber to a reduced pressure, for a time period sufficient to substantially completely evacuate entrapped air and moisture from the internal interstices of the ceramically bonded grain structure, which constitutes the shape, flooding the closed chamber with a heated, cokable, nonaqueous carbonaceous material, inert to the material of which the shape is fabricated, to a depth sufficient to completely submerge the shape, pressurizing the chamber with a gas, maintaining the pressurization for a time period sufficient to saturate the evacuated interstices of the shape, and produce impregnation substantially uniformly through the cross section thereof, releasing the pressure, removing and cooling the impregnated shape.

13. The process of claim 12, in which the gas used for pressurization is an inert gas.

14. The process of claim 12, in which the gas is selected from the group nitrogen and carbon dioxide.

15. The process of claim 12, in which the carbonaceous material is at a temperature between about 200 and 450° F.

16. The process of impregnating porous, ceramically bonded, basic refractory brick which comprises preparing the brick by preheating it to a temperature between about 200 and 500° F., and applying sealing means to an exposed surface thereof said sealing means arranged to prevent ingress to a limited surface area of heated, cokable, nonaqueous, carbonaceous material in which the shape is subsequently immersed, then placing the preheated brick in a treatment vessel, closing the treatment vessel to the atmosphere, evacuating the interior of the vessel, and maintaining such evacuated condition for a time period sufficient to evacuate entrapped air and moisture from the interstices from the ceramically bonded grain structure which constitutes the brick, flooding the interior of the vessel with a nonaqueous, cokable, carbonaceous fluid heated to a temperature between about 200 and 450° F., adding sufficient of such fluid as to completely submerge the brick, subjecting the vessel and its contents to pressurization by gas, maintaining the pressure for a time period sufficient to substantially saturate the evacuated interstices of the brick and result in substantially uniform cross sectional saturation thereof, removing the carbonaceous fluid from the vessel, again subjecting the impregnated brick to super-atmospheric pressure for at least about one minute, releasing the pressure from the vessel, opening the vessel and removing the impregnated brick therefrom.

17. The process of claim 16, in which the reduced atmosphere is maintained for at least about five minutes.

18. The process of claim 16, in which the initial pressurization of the vessel with gas is maintained at a pressure of about 90 p.s.i. for about one minute.

19. The process of impregnating a ceramically bonded basic refractory shape, which shape consists essentially of at least about 96% MgO+CaO, on the basis of an oxide analysis, the CaO ranging from 1 to 59%, by weight, which comprises the steps of:

(A) heating the shape to a temperature between about 200 and 400° F., and placing a film of sealing means on an exposed surface, said sealing means being inert to the materials it is subsequently to contact in the process, (B) placing the heated shape while still at a temperature between about 200 and 400° F., in a closable vessel, (C) closing the vessel and evacuating it to below atmospheric pressure,
   (1) maintaining the shape in such a reduced pressure atmosphere for at least about 1 to 5 minutes, (D) introducing fluid, nonaqueous, cokable, carbonaceous material to the vessel in a quantity sufficient to completely submerge the shape therein,
   (1) said fluid, carbonaceous material being at a temperature between about 200 and 450 F., (E) applying a super-atmospheric pressure to the vessel
   (1) maintaining the pressure for at least about 1 minute, (F) removing substantially all of the carbonaceous fluid from the vessel, (G) again subjecting the vessel to super-atmospheric pressure
   (1) maintaining this pressure for at least about 1 minute, (H) removing the impregnated shape from the vessel, (I) reheating the impregnated shape to a temperature between about 200 and 1000° F., (J) removing the impregnated shape.

References Cited by the Examiner

UNITED STATES PATENTS

| | | | |
|---|---|---|---|
| 1,937,417 | 11/1933 | Wallace | 117—54 X |
| 1,982,314 | 11/1934 | Ledeboer | 117—54 X |
| 2,083,863 | 6/1937 | Pfeiffer | 117—54 X |
| 2,982,671 | 5/1961 | Hunter | 117—61 |
| 3,106,475 | 10/1963 | Davies et al. | 117—123 X |
| 3,141,790 | 7/1964 | Davies et al. | 117—123 |

RICHARD D. NEVIUS, *Primary Examiner.*

W. L. SOFFIAN, *Assistant Examiner.*